Jan. 20, 1959   F. A. KROMER   2,869,918
VEHICLE FILLER TUBE LOCKING BRACKET
Filed Aug. 31, 1955

INVENTOR.
FRANKLIN A. KROMER
BY
*William J. Ruano*
*his attorney*

United States Patent Office 2,869,918
Patented Jan. 20, 1959

2,869,918

VEHICLE FILLER TUBE LOCKING BRACKET

Franklin A. Kromer, Pittsburgh, Pa.

Application August 31, 1955, Serial No. 531,663

1 Claim. (Cl. 296—1)

This invention relates generally to a vehicle body construction and, more particularly, to a locking bracket means for supporting a license plate and for preventing unauthorized access to the fuel tank filler tube located at the rear of a vehicle.

Recently, fuel tank filler tubes which were conventionally located on the side of a rear fender were moved to the rear central portion of the vehicle in certain makes of passenger vehicles so as to shorten the required length of the filler tube and so as to conceal it by the rear, pivotally mounted license plate. This arrangement has an outstanding disadvantage in that the fuel tank filler tube is readily accessible by unauthorized persons, therefore making it possible to remove the fuel tank filler tube cap and to steal gasoline by applying suction through a hose inserted into the tube, also making it accessible for removal of the cap by children who sometimes inject dirt or water into the tank which is extremely deleterious.

An object of this invention is to provide a novel locking bracket which serves the dual purpose of supporting the license plate and locking such plate in a manner so as to prevent access to the fuel tank filler tube which is concealed thereby so as to overcome the above mentioned disadvantages.

A more specific object of the present invention is to provide a pivotally mounted locking bracket for supporting a license plate and which is so arranged as to be locked in place by the rear hinged luggage compartment lid so as to make it impossible to gain access to the fuel tank filler tube or cap without first unlocking the luggage compartment lid.

Other objects and advantages of the present invention will become apparent from a study of the following description taken with the accompanying drawing wherein.

Figure 1:
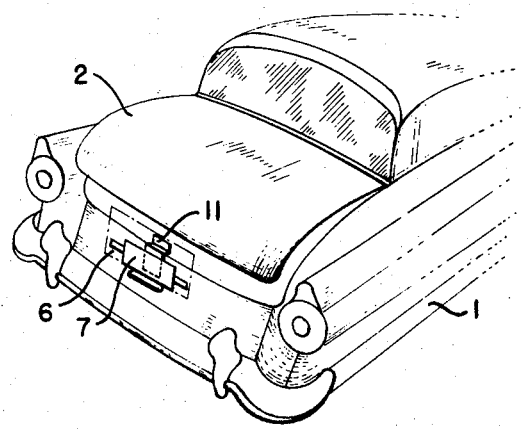
Figure 1 is a rear perspective view of a portion of a motor vehicle body embodying a filler tube locking bracket in accordance with the teachings of my invention.
Figure 2:
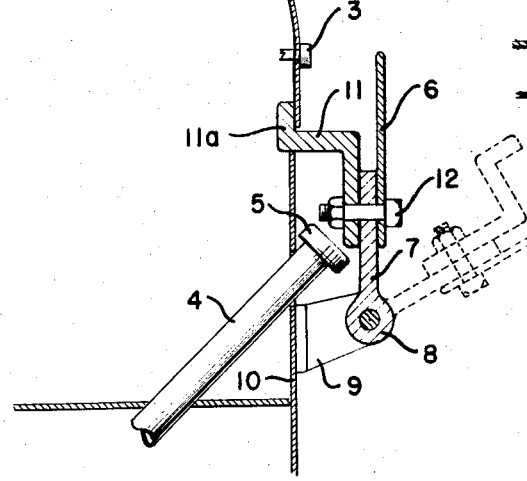
Figure 2 is an enlarged transverse cross-sectional xiew of the locking bracket and associated parts shown in Figure 1.

Referring more particularly to Figures 1 and 2 of the drawing, numeral 1 denotes a motor vehicle passenger car body having a conventional hinged luggage compartment lid 2 including a cylinder lock 3 of conventional type. By insertion of a key into the lock 3 and turning of the key and thereafter applying a lifting movement to the key, lid 2 may be moved to the position shown in dotted lines in Figure 2. Emerging from the rear, central portion of the luggage compartment is a fuel tank filler tube 4 having a cap 5 of any well-known type.

A license plate 6 is mounted on a support bracket 7 which is pivotally mounted at hinge portion 8 on a U shaped lower hinge member 9 mounted on the central portion of the lower back body panel 10 and which has apertured end flanges which support the pivot for bracket 7. Also mounted on mounting bracket 7 is a locking bracket 11, in accordance with the present invention, having an upper portion which is offset laterally and then projects upwardly at portion 11a in a manner so as to fit behind the lower portion of the luggage compartment lid 2 so that the latter will hold it in the locked position shown in Figure 2. The locking bracket 11 together with license plate 6 may be mounted by any suitable fastening means to the mounting bracket 7, such as by means of one or more bolts 12.

When it is desired to gain access to the fuel tank filler tube 4, and cap 5 to fill the tank with gasoline, the license plate 6 is pulled rearwardly, that is, to the right as viewed in Figure 2 to the dotted line position carrying with it the locking bracket 11, assuming, of course, that the luggage compartment lid 2 has first been unlocked and lifted to the position shown in dotted lines. This pivotal movement is resisted by the tension of helical springs which encircle the pivotal shaft of bracket 7 (not shown) so that upon release of the license plate 6 the springs will automatically move bracket 7 and the associated parts to the vertical position shown in full lines in Figure 2. Thus after the gasoline attendant has filled the gas tank and replaced the cap 5, he will release hold of the license plate 6, therefore allowing it to automatically move to the vertical position. Then he will lower the luggage compartment lid to the locking position as shown in full lines and the lock 3 will automatically lock lid 2 in the locking position. Lid 2 also locks bracket 11 in the vertical position. After this is done it is impossible to gain access to the fuel tank filler tube or its cap 5 without first unlocking the lock 3 with a key and lifting the luggage compartment lid 2 out of locking engagement with the locking bracket 11. Thus the pivotally mounted brackets 7—11 serve the dual purpose of pivotally supporting the license plate in a position such that it will normally conceal the fuel tank filler tube and cap, and as a locking bracket which is engageable by the lower inner portion of luggage compartment lid 2 to prevent theft of gasoline by unauthorized access to the filler tube.

Thus it will be seen that I have provided an efficient locking bracket means which supports a concealing license plate for hiding the rear, central gas fuel tank filler tube from view and which, at the same time, embodies a locking bracket which is engageable by the rear luggage compartment lid so as to make it possible to lock the bracket and license plate assembly merely by the conventional luggage compartment lock so that access may be had only by authorized persons who will first unlock the rear luggage compartment. More specifically, I have provided means for preventing access to the fuel tank filler tube by use of the ordinary conventional luggage compartment lock and without the necessity of providing additional locking means and which is relatively inexpensive in construction, therefore which considerably reduces the cost for protection against tampering with the filler tube, and in which such protection is made possible by the simple addition of a locking bracket to a conventional assembly.

However bracket 11 need not necessarily be locked by lid 2 of the luggage compartment but may be locked by other locking means, controllable at the dashboard.

Figure 3:
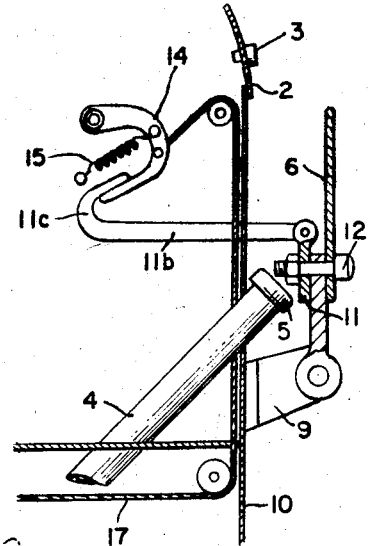
Figure 3 is a fragmentary view of a modification.

Figure 3 shows such modification of the locking bracket 11 which eliminates the vertical projection 11a and uses instead a horizontally extending hooked portion 11b which projects through a hole in the lower portion and terminates in hook 11c which is engageable by the pawl 14 biased in the hooked position by spring 15 and which is releasable by the pull of wire 17 connected to the pawl. Wire 17 may be led underneath the car and to the dashboard where it may be pulled manually by the operator. Or it may be pulled by an electro magnet (not shown) merely by depressing of a button on the dashboard which will energize the electro magnet so as to draw a magnetic core onto which the wire is attached.

While I have illustrated and described several embodiments of my invention, it will be understood that these are by way of illustration only, and that various changes and modifications may be made within the contemplation of my invention and within the scope of the following claim.

I claim:

In a motor vehicle having a driver's compartment and a body luggage compartment, the latter including a lid pivotally mounted forwardly of the vehicle and including a vertical rear wall through which a fuel tank filler tube projects and on which is hinged a license plate supporting bracket means including a bracket portion which extends through a hole in said rear wall above said tube projection, in combination, latching means mounted inside said luggage compartment for normally latching said bracket portion, and cable means extending to the driver's compartment and connected to said latching means for unlatching said bracket portion at the will of the driver while seated in the driving compartment.

References Cited in the file of this patent

UNITED STATES PATENTS

| | | |
|---|---|---|
| 2,035,895 | Kelly | Mar. 31, 1936 |
| 2,529,361 | Abbas | Nov. 7, 1950 |
| 2,693,381 | Butler | Nov. 2, 1954 |
| 2,708,594 | MacPherson | May 17, 1955 |
| 2,729,500 | Dickenshied et al. | Jan. 3, 1956 |

FOREIGN PATENTS

| | | |
|---|---|---|
| 37,428 | France | Sept. 9, 1930 |